May 27, 1930.  W. L. CLOUSE  1,759,890
FEED FOR BOLT TRIMMING MACHINES
Filed Nov. 13, 1926    2 Sheets-Sheet 1

Inventor
William L. Clouse
By
Attorneys

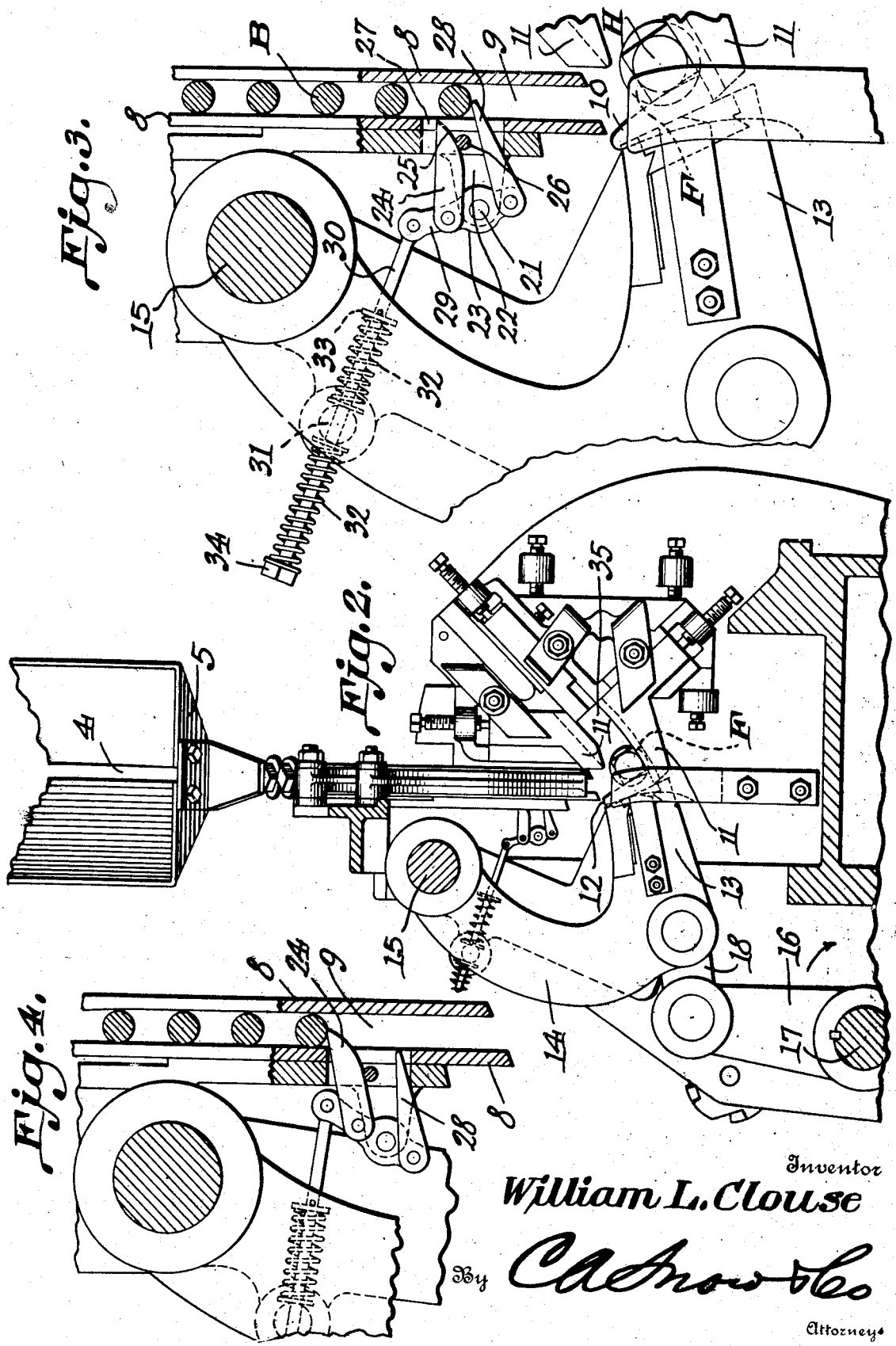

Patented May 27, 1930

1,759,890

UNITED STATES PATENT OFFICE

WILLIAM L. CLOUSE, OF TIFFIN, OHIO, ASSIGNOR TO THE NATIONAL MACHINERY CO., OF TIFFIN, OHIO

FEED FOR BOLT-TRIMMING MACHINES

Application filed November 13, 1926. Serial No. 148,288.

This invention relates to feeding mechanism for use in connection with bolt trimming machines, one of the objects of the invention being to provide means whereby the bolts to be trimmed are suspended at all times during the feeding operation with their heads uppermost, novel means being employed for automatically spacing the bolts so that the flashings formed of the surplus metal around the heads thereof will be prevented from lapping as the bolts are moving toward the trimming dies.

Another object is to provide feeding mechanism the bolt supporting means of which is inclined so that the weight of the bolt upon its inclined support assists in feeding the bolt to the trimming dies.

A still further object is to provide inclined means for disposing of the bolts and the surplus metal trimmed therefrom so that these parts can be delivered by gravity to suitable conveying means used for carrying the articles from the machine.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 2 is a plan view thereof parts of the supporting structure being shown in section.

Figure 3 is an enlarged view partly in section and partly in plan of the bolt spacing mechanism.

Figure 4 is a view of a portion of the bolt spacing mechanism showing a second position of the dogs.

Figure 1:
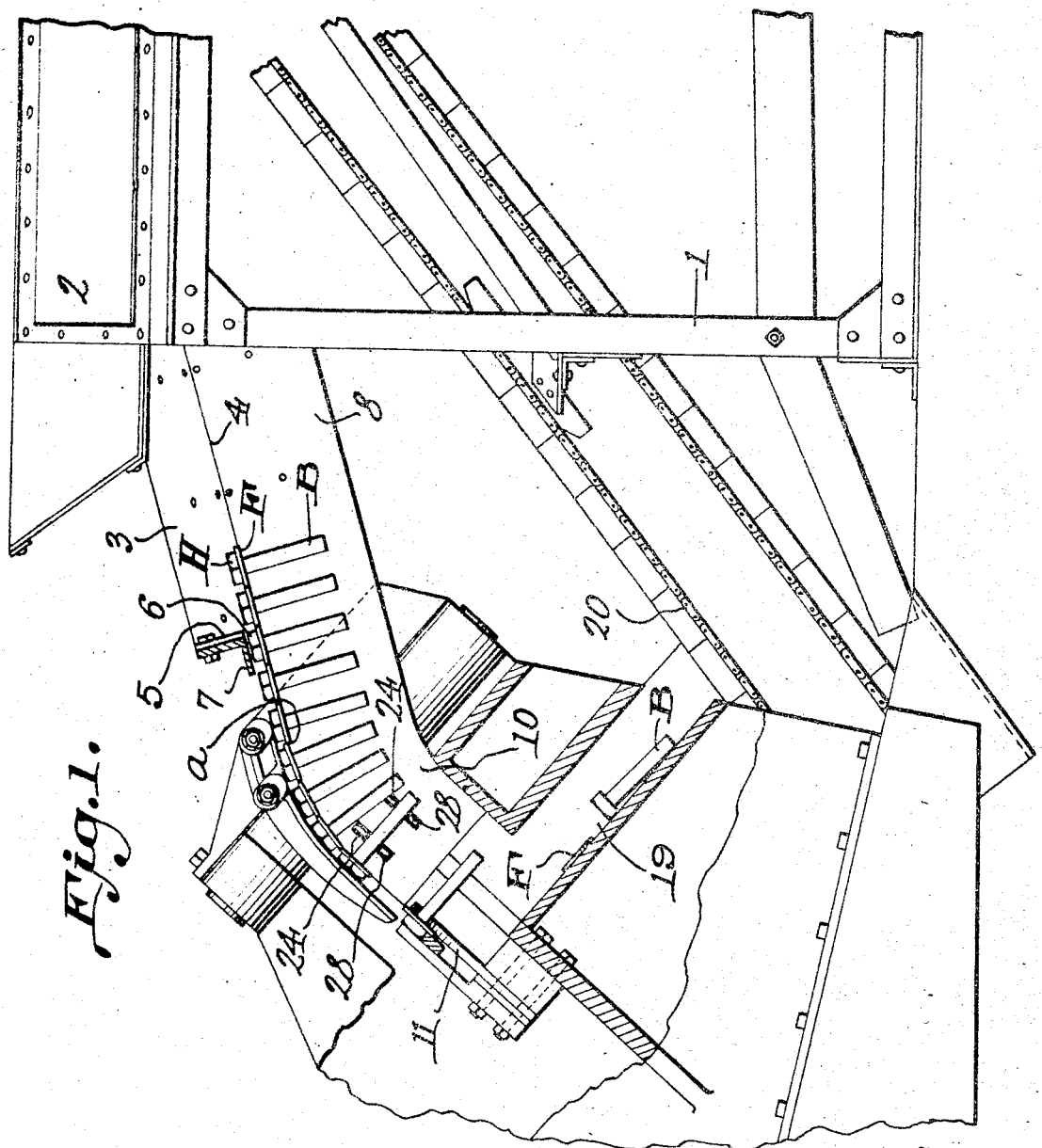
Figure 1 is a vertical longitudinal section through the feeding mechanism.

Referring to the figures by characters of reference 1 designates a supporting structure having a hopper a portion of which has been indicated at 2 for containing bolts received from a header. This hopper has an outlet trough 3 provided with a slot 4 along the bottom thereof, the sides of the trough being inclined downwardly toward this slot. The trough is inclined downwardly toward one end where it is closed by a wall 5 having an opening 6 through the bottom portion thereof sufficiently large to allow the heads of bolts to pass freely therethrough. A shield 7 is connected to this end wall and extends downwardly beyond the outlet opening 6 so as to overhang the heads of the bolts as they pass out of the trough. Parallel downwardly inclined guide plates 8 extend along the sides of the slot 4 and are continued beyond the lower end of the trough, these plates forming between them a bolt receiving channel 9. The width of the channel is slightly greater than the diameter of the shanks of bolts B but the heads H of the bolts are of greater diameter than the width of the channel so that when these bolts with the surplus metal radiating therefrom, forming flashings F are delivered to the guides, the shanks B will assume positions within the channels while the flashings and heads will rest on the guides and be free to gravitate downwardly along their upper edges.

The lower end portions of the guides are turned downwardly as at 10 so as to direct the heads of the bolts onto a pair of spaced supporting members 11 suitably constructed to receive the flashings of the bolts as they are successively fed thereto and as indicated in Figure 2. A deflecting tongue 12 is supported adjacent the ends of the guides 8 and when a bolt gravitates off of these guides it will assume a position with its head resting on the tongue 12 and in engagement with one of the members 11 as shown particularly in Figure 2. When the bolt is in this position the head thereof is in the path of a jaw 13 carried by an arm 14 and this arm is mounted to swing about a pivot shaft 15. A crank arm 16 carried by a shaft 17 is mounted for oscillation and is connected to the arm 14 by a link 18. Thus the link 18 and the arm 16 cooperates to form a toggle which, when broken, by the movement of arm 16 to the position shown in Figure 2, will bring the jaw 13 where it will allow the bolt to move freely to the position shown in Figure 2. When the arm 16 is swung in the direction indicated by the arrow in Figure 2, however, the toggle will be straightened out and the jaw 13 will thrust against the bolt so as to bring it to position adjacent the upper end of an outlet chute 19 shown in Figure 1. This chute is inclined downwardly so as to deliver bolts and scrap to an endless conveyor 20 used for conducting the material away from the machine. It might be stated that suitable cutting dies are to be located at the upper end of the chute 19 and means are to be employed for engaging the head of the bolt and thrusting it downwardly between the dies and into the chute 19 each time a bolt is brought to position above the chute by the jaw 13. This punching and cutting mechanism constitutes no part of the present invention and for this reason has not been shown or described in the present application.

As before pointed out the bolts, when delivered to the guides 8 will be suspended in the channel 9 with their heads and flashings resting on the guides 8. During the gravitation of the bolts along the guides the flashings will tend to ride one upon the other or lap as shown, for example, at a in Figure 1. If this should be permitted to continue throughout the travel of the bolts they would bind and not properly gravitate to the jaw 13. It is essential, therefore, that some means be utilized for holding the bolts properly spaced before they are delivered to the jaw 13. It is also essential that the bolts be delivered one at a time to the jaw in properly timed relation to the oscillation thereof. For this purpose a novel arrangement of parts is employed. A shaft 21 is journaled adjacent one of the guides 8 within the bearings 22 provided therefor and secured to this shaft is a lever 23 to one end of which is pivotally connected a spacing dog 24 having one edge portion rounded as at 25 to constitute a cam. This cam edge is adapted to slidably engage a guide pin 26 located in a slot 27 in the adjacent guide 8 and the free end portion of the dog is adapted to work within this slot. The other end of the lever 23 has a releasing finger 28 pivotally connected to it and adapted to work into slot 27. Under normal conditions this finger projects into the channel 9 and into the path of the bolts B as shown in Figure 3 but under other conditions finger 28 is withdrawn into the slots from the channel, thereby to release a bolt engaged thereby. Prior to such release, however, the dog 24 is thrust into the channel as shown in Figure 2, the cam edge thereof riding on the pin 26 to cause the dog, during such movement into the channel, to first assume a position back of the first or leading bolt and then to swing backwardly toward and against the second bolt so as to thrust it away from the first bolt and insure separation of the flashings of the two bolts if by any chance one of them is resting upon the other. Thus when the finger 28 is withdrawn from the path of the first bolt there is no danger of said bolt being retarded in its gravitation toward the path of the jaw 13 by the weight of the second bolt clamping the flashings of the first bolt onto the guides.

For the purpose of actuating shaft 21 in properly timed relation to the movement of the jaw 13, a crank arm 29 is extended from the shaft 21 and has a rod 30 pivotally connected to it. This rod is slidably mounted in a pin 31 carried by arm 14. Springs 32 bear against opposite portions of the pin 31 and are extended in opposite directions therefrom on the rod 30. One of these springs bears against a collar 33 on the rod while the other spring bears against an adjusting nut 34 carried by the rod.

As shown in Figure 1 two superposed sets of dogs 24 and fingers 28 can be used, it being understood that the dogs and fingers of both sets are connected to the shaft 21 in the same manner heretofore described.

It is believed that, from the foregoing description, the operation of the mechanism will be fully understood but nevertheless the following résumé of the operation may be desirable:

During the operation of the machine the jaw 13 and its arm 14 are swung back and forth by suitable mechanism provided for that purpose and this mechanism includes the toggle formed of the arm 16 and link 18. Each time the jaw moves to the right in Figure 2 it thrusts through one of the springs 32 against rod 30 so as to cause shaft 21 to rotate and bring the dog 24 and the finger 28 to the positions shown in Figure 4. This will result in the release of the first bolt supported by the guides 8 and said bolt will gravitate along the guides until it reaches a position against the advancing jaw. At this time the jaw will engage a bolt head already in the path thereof and thrust it to proper position in the trimming mechanism located at the closed end of the space 35 provided between the members 11. As before stated this trimming mechanism constitutes no part of the present invention and has therefore not been illustrated or described. It need only be stated, however, that after being acted on by the trimming mechanism the bolt, with the severed scrap will drop into the inclined chute 19 and be conducted to the conveyor 20. In Figure 1 the severed flashing in the form of scrap has been indicated at F.

After the trimming operation has taken place the jaw 13 swings back toward the left in Figure 2 and during this movement motion is transmitted from the arm 14 through one of the springs 32 and the rod 30 so as to cause shaft 21 to rotate in the opposite direction, thereby withdrawing dog 24 from the path of the bolts but first projecting finger 28 into the path of the bolts. The parts will remain thus until the previously released bolt gravitates into the path of the jaw and is shifted toward the trimming mechanism whereupon the finger 28 and dog 24 will again be actuated as before explained to permit delivery of the bolts into the path of the jaw.

Importance is attached to the fact that the flashings of successive bolts cannot crowd upon each other and retard gravitation of the bolts while being fed, this resulting from the back spacing action of the cam dog 24 heretofore described. Importance is also attached to the fact that the bolts, while passing through the machine are suspended with their heads uppermost at all times and are movable downwardly during both the feeding and delivering operations so that the machine will not become clogged by the bolts or scrap.

While the mechanism herein described is designed primarily for use in connection with bolt trimming machines it is to be understood that the same can be used in connection with all types of bolt machinery. In fact it has been found in practice that much difficulty is experienced in feeding bolts to various types of bolt machinery and therefore the present improvements can be used to advantage in connection with all such machines. This is true whether or not the bolts being acted on are provided with flashings. In any case the mechanism constituting the present invention serves to shift the column of bolts through the cam action of the dog 24 and this naturally greatly assists in securing perfect feeding by acting to break up any wedging action that might start.

What is claimed is:

1. In a machine of the class described, the combination with downwardly inclined guides for supporting bolts therebetween with their heads uppermost, and a downwardly inclined delivery chute, of a laterally movable jaw for transferring bolts from the outlet end of the guides to the inlet end of the delivery chute, and means controlled by the operation of the jaw for moving in opposite directions the heads of two adjoining bolts suspended from the guides and thereafter releasing one of the bolts for gravitation to the jaw.

2. In a machine of the class described the combination with parallel guides forming a bolt receiving channel therebetween, said guides constituting means for supporting bolts with their heads uppermost, of a shaft, a lever movable therewith, a spacing cam member connected to one end of the lever, a holding member connected to the other end of the lever, means for actuating the shaft to successively project and retract said members relative to the channel, and means cooperating with the cam member for imparting a swinging movement thereto while being projected into the channel, thereby to move backwardly one of two adjoining bolts restrained by the holding member, and said holding member constituting means for releasing the other one of said bolts after the spacing operation.

3. In a machine of the class described the combination with spaced guides and a jaw mounted for back and forth movement at one end of the guides, said guides being inclined downwardly toward the jaw, of intermittently operating means adjacent the guides for releasing bolts one at a time and for back spacing the head of the bolt next to the released bolt prior to each release, and a yieldable operating connection between the jaw and said means.

4. In a bolt machine the combination with a jaw mounted for back and forth movement and spaced guides inclined downwardly toward the jaw constituting bolt-supporting and feeding means, of means for releasing the bolts one at a time for gravitation to the jaw, and means for positively back-spacing the head of the bolt nearest the one being released, each one of said means operating in timed relation to the other.

In testimony that I claim the foregoing as my own, I have hereto affixed my signature.

WILLIAM L. CLOUSE.